United States Patent
Weichbrodt et al.

[15] 3,677,072
[45] July 18, 1972

[54] DAMAGE DETECTION METHOD AND APPARATUS FOR MACHINE ELEMENTS UTILIZING VIBRATIONS THEREFROM

[72] Inventors: Bjorn Weichbrodt; Bernard Darrel, both of Schenectady, N.Y.

[73] Assignee: General Electric Company

[22] Filed: Oct. 30, 1970

[21] Appl. No.: 85,332

[52] U.S. Cl. ................................................73/67, 340/261
[51] Int. Cl. ..........................................................G01n 29/00
[58] Field of Search ........................73/67, 71.4, 69; 340/261

[56] References Cited
UNITED STATES PATENTS 3,095,730    7/1963    Matheson...................................73/67
3,486,616    12/1969   Brany et al..............................73/67 X Primary Examiner—Richard C. Queisser
Assistant Examiner—Arthur E. Korkosz
Attorney—Paul A. Frank, John F. Ahern, Julius J. Zaskalicky, Frank L. Neuhauser, Oscar B. Waddell and Joseph B. Forman

[57] ABSTRACT

A system for detection of damage to a machine element in rolling engagement with another machine element utilizing vibrations produced by such damage. The peak value of the vibration signal obtained from the machine elements is compared with the mean value of the rectified vibration signal to obtain a ratio which is an indication of and the extent of the damage to the machine element.

7 Claims, 5 Drawing Figures

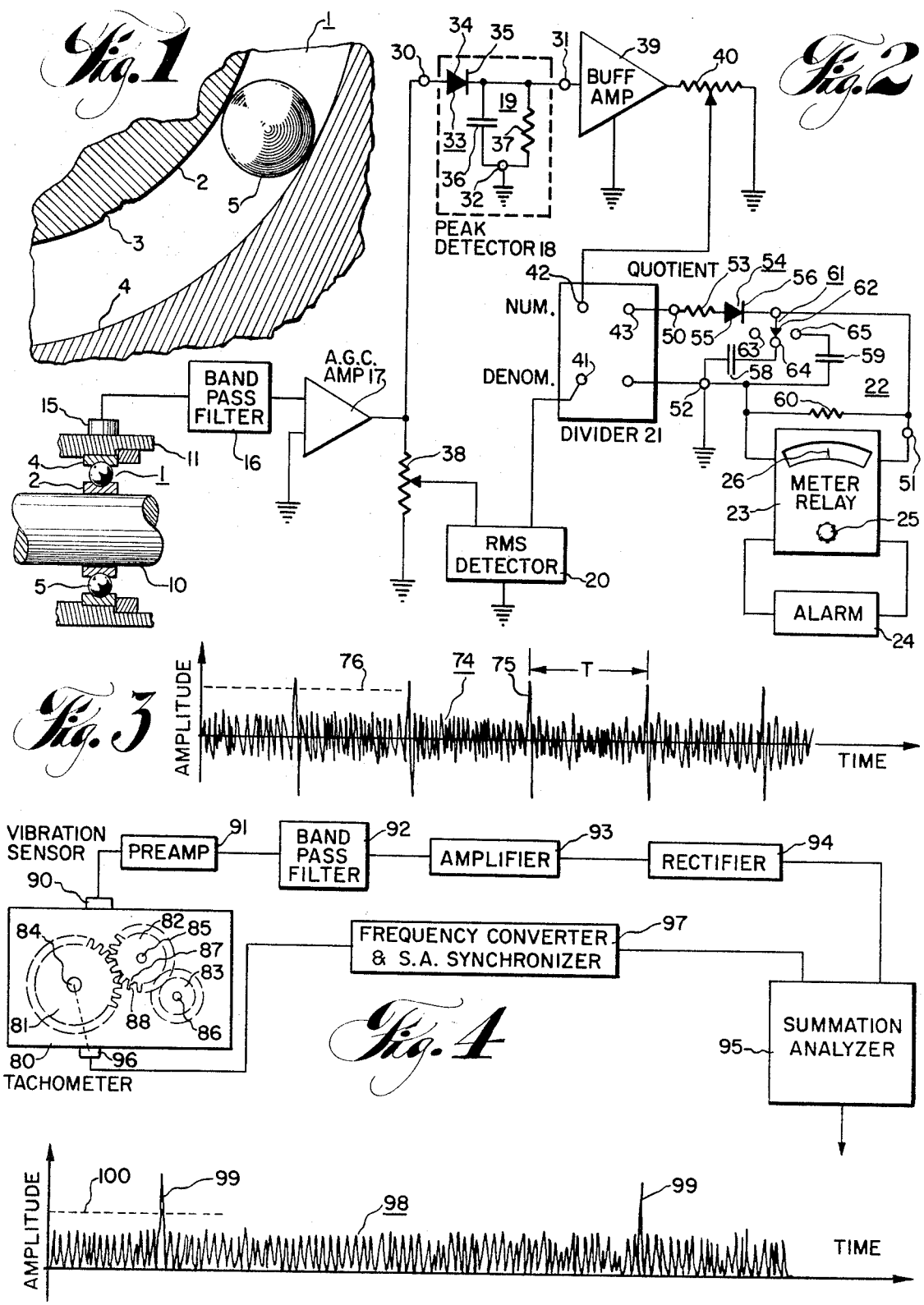

DAMAGE DETECTION METHOD AND APPARATUS FOR MACHINE ELEMENTS UTILIZING VIBRATIONS THEREFROM

This invention relates to a method and apparatus for the early detection of faults in machine elements in rolling engagement such as a bearing or gear elements.

Techniques for the detection of incipient failure of bearings in current use are either visual and require costly disassembly and reassembly procedures, or depend upon the amplitude of the vibration signals generated by the bearing itself. The amplitude of the vibration signals from the bearing is not necessarily indicative of the condition of the bearing. New bearings from different manufacturers will produce different amplitudes of signal as a result of variations in final grinding techniques used thereon. Variations in amplitude of vibration signals from bearings made by the same manufacturer as well cannot be reliably correlated to the condition of the bearings. In addition, noise signals from new bearings are usually higher than those from a good used bearing as the many grinding scratches produced in the manufacture of the bearing increase the overall noise signal. Under use the bearing surfaces are gradually burnished and consequently the noise signal obtained therefrom is considerably reduced. As the bearing fatigues, pits or spalls are produced that cause large amplitudes of signal to appear over only a small portion of a cycle of operation. At this time the overall vibrational level can still be small.

Accordingly, techniques relying on the overall vibration signal level from the bearing are not completely reliable or sufficiently sensitive to provide an indication of incipient failure. In a copending patent application, Ser. No. 23252, filed Mar. 27, 1970, and assigned to the assignee of the present invention there is disclosed a technique for the separation of peak signals from vibration or sonic signals from bearing or gear assemblies and correlating the peak signals with localized defects in elements of the bearing or gear assemblies for the purpose of determining incipient failure. The present invention is directed to providing a simplification in the technique described in the aforementioned application suitable for use in certain cases where the requirement for signal sensitivity is not quite as high.

Accordingly, an object of the present invention is to provide means for processing of vibration signals measured externally on an assembly of engaging rolling elements to provide information about the existence of defects in the rolling elements.

Another object of the present invention is to provide a simple means for providing an indication of the presence of peaks in a signal corresponding to incipient bearing damage or failure regardless of the absolute level of the vibration signal coming from the bearing.

Another object of the present invention is to provide a vibration processing means for the detection of defects in rolling elements in engagement which can be easily automated.

Another object of the present invention is to provide simple apparatus capable of detecting small surface defects in bearings while normally operating in noisy environments.

In carrying out the invention as applied to detection of damage in a bearing assembly, vibrations of the bearing assembly are sensed and converted into an electrical signal during the operation of the bearings. The electrical signal is filtered in a wide bandpass filter to enhance the significant signal components thereof. Means are provided for deriving a second signal from the electrical signal corresponding to the peak value thereof. A signal processing circuit is also provided for deriving a third signal from the electrical signal corresponding to a mean value of the rectified electrical signal. A ratio circuit is provided for deriving a ratio signal corresponding to the ratio of the amplitudes of the second and third signals. A level responsive indicator is provided responsive to a predetermined level of the ratio signal corresponding to a peak of a second predetermined level in the electrical signal in relation to the mean value thereof.

The novel features which are believed to be characteristic of the present invention are set forth in the appended claims. The invention itself together with further objects and advantages thereof may best be understood by reference to the following description taken in connection with the accompanying drawings wherein:

FIG. 1 is a sectional view of part of a bearing showing an inner race with a defect, an outer race and one ball.

FIG. 2 is a block diagram of the apparatus of the invention partly in schematic form showing an embodiment of the invention as applied to the detection of a defect in the bearing illustrated in FIG. 1.

FIG. 3 shows a graph of an electrical signal representing the amplified and filtered output of the vibration transducer of FIG. 2 in response to the defect in the bearing shown therein.

FIG. 4 shows a diagram partly in schematic form of apparatus illustrating a modification of the apparatus of FIG. 2 applied to the detection of defects in a gear transmission.

FIG. 5 shows a graph of a signal obtained at the output of the apparatus of FIG. 4 when monitoring a gear with a defect in the gear transmission thereof.

A rolling element bearing, if properly designed and operated, performs its function without appreciable wear of the bearing surfaces. But even if the wear is negligible the cyclical loads of the rolling elements passing over the bearing surfaces cause fatigue of the material so that after a time surface defects begin to appear. These defects are at first few and local. The time before the initial defects occur may be greatly shortened by excessive temperature, lubrication failure, corrosion, etc. and can therefore normally not be calculated. Once the initial surface defects have developed, the bearing enters into a new phase of its life, characterized by considerably higher wear or destruction rate, and finally fails to perform its function. To predict bearing failure, it is therefore essential to detect the first surface defects while they are few and local.

FIG. 1 shows a part of a bearing 1 including an inner race 2 with a defect 3 located therein, an outer race 4 and a ball 5 included between inner and outer races. The present invention makes use of the fact that an impact is generated every time a defect in an otherwise smooth surface comes into rolling contact with any other smooth surface. For example, the dent 3 in the inner race 2 of the ball bearing 1 generates an impact every time a ball rolls over it. As a result of the symmetrical shape of a bearing the defect generates a sequence of impacts approximately equally spaced in time provided the bearing rotates at substantially constant speed. The time interval between two subsequent impacts depends on the bearing speed, geometry and the location of the defect.

Reference is now made to FIG. 2 which shows in section the bearing 1 with the inner race 2 supporting shaft 10 and the outer race 4 mounted on the support structure 11. The detection system in accordance with the present invention includes an accelerometer 15 which is mounted on the support structure 11 adjacent the bearing 1, a bandpass filter 16 which allows a predetermined frequency range of the vibration signal from the accelerometer to be passed therethrough, an automatic gain control amplifier 17 for amplifying the signal from the bandpass filter. Also included are a peak detection circuit 18 including a time constant network 19 for detecting peak values of signal, a root means square detection circuit 20 for obtaining the root mean square value of signal from the a.g.c. amplifier 17, a divider circuit 21 for the ratio of the peak amplitude to the root mean square value of signal, a long time constant circuit 22 for minimizing the effect of singular transient noise, a meter relay device 23 which is responsive to a predetermined level of signal for actuation of a suitable indication means such as an alarm 24. The accelerometer 15 converts mechanical vibrations into an electrical signal in which the amplitude of the electrical signal varies in accordance with the acceleration component of the mechanical vibrations. Such a device is particularly sensitive to impacts. The accelerometer is mounted on the support 11 close to the bearing 1 to produce good response to vibrations from the bearing. The filter 16 is a conventional filter for eliminating background noise and for passing the peak signals which it is desired to detect. The automatic gain controlled amplifier 17 is a conventional automatic gain controlled amplifier. The gain of the amplifier preferably is controlled by the peaks of the electrical signal to maintain a predetermined level of output and to avoid clipping of large peaks in the electrical signal. If desired the gain of the amplifier may be controlled in response to a mean value of the rectified electrical signal. The output of the amplifier 17 is supplied to the peak detection circuit 18 and to the root means square detection circuit 20.

The peak detection circuit 18 includes an input terminal 30, and output terminal 31 and a common input-output terminal 32. The peak detection circuit also includes unilaterally conducting device or rectifier 33 having an anode 34 and a cathode 35. The anode 34 is connected to the input terminal 33, the cathode 35 is connected to the output terminal 31 and common terminal 32 is connected to ground. A capacitor 36 and a resistor 37 forming time constant network 19 are connected in parallel between the output terminals 31 and 32. Alternating voltage from the amplifier 17 is applied to the input terminals 30 and 32 of the peak detection circuit 18 and is rectified and peak voltage appears across the output terminals thereof. The peak voltage appearing across the terminals 31 and 32 decays in amplitude in accordance with the time constant of the network 19. The time constant of the network 19 is selected so as to substantially retain the voltage developed thereacross during the interval between peaks in the electrical signal produced by the repeated impacts in the bearings.

The output from the amplifier 17 is also applied through a potentiometer 38 to a circuit 20 for determining a mean value of the electrical signal. In the embodiment shown the detector circuit 20 is shown as a root mean square detector. The root mean square detector develops an output which is the root mean square value of the alternating signal applied to the input thereof and represents the average energy content of the signal. The root mean square detector may be a detector such as Series 742/9742 made by Transmagnetics of Flushing, New York. Other circuits for deriving a mean value of a signal of course may be utilized. The output of the root mean square detector is applied to the denominator terminal 41 of a divider 21. The output from the peak detector 18 is applied through a buffer amplifier 39 and a potentiometer 40 to the numerator terminal 42 of the divider 21. From the quotient terminal 43 of the divider 21, a signal is obtained which represents the quotient of the signals applied to the numerator and denominator terminals and represents the ratio of the peak signal to the root mean square signal obtained from the accelerometer. The potentiometers 38 and 40 function to vary the sensitivity of the apparatus through adjustment of the gains of the signal channels feeding the numerator and denominator terminals of the divider 21. The divider 21 may be any of a number of dividers, for example, such as analog divider series 450 made by Transmagnetics of Flushing, New York.

The long time constant circuit 22 includes an input terminal 50, an output terminal 51 and a common input and output terminal 52. The long time constant circuit 22 also includes a series current limiting resistor 53, a unilaterally conducting device or rectifier 54 having an anode 55 and a cathode 56, a time constant network including capacitors 58 and 59 of different capacitances, resistor 60 and a switch 61 including an arm 62 and three contacts 63, 64 and 65. The anode 55 of the rectifier is connected through resistor 53 to the input terminal 50, and the cathode 56 of the rectifier is connected to the output terminal 51. The arm 62 of the switch is connected to the cathode 56 of the rectifier. The capacitor 58 is connected between the contact 64 and terminal 52 and capacitor 59 is connected between the contact 65 and terminal 52. The resistor 60 is connected between the output terminals 51 and 52. The time constant of the output circuit of the long time constant circuit 22 may be controlled by setting of the arm 62 of the switch to parallel the appropriate capacitors 58 or 59, in shunt with the resistor 60 to provide the desired time constant. The time constant of the output of the circuit 22 is selected so that it is relatively large in relation to the period of rotation of the bearing element under investigation. Accordingly, it has an averaging effect on the output of the divider 21 when the output signal from the accelerometer 15 includes a periodic peak signal while producing an output that varies somewhat from one revolution to the next resulting from stray and random causes. The output from the long time constant circuit 22 is applied to a meter relay 23. The meter relay may be any of a variety of such devices commonly available, for example, the noncontacting meter relay made by the Instrument Department of General Electric Company located at Lynn, Massachusetts, which are responsive to a given level of input for actuation of a pair of contacts. Closure of the contacts of the relay is utilized to actuate an alarm 24 connected thereto to provide an indication that a particular level of an input has been applied to the meter relay 23. The knob 25 of the meter relay sets the pointer 26 on the face of the meter relay to a desired level. When the input signal causes a meter element of the relay to be aligned or exceed that level, the contacts of the relay are actuated without loading the input circuit of the meter relay to effect the operation of external apparatus such as the alarm 23.

Reference is now made to FIG. 3, which shows a graph 74 of the signal produced by the bearing 1 and sensed by accelerometer 15 of FIG. 2. The ordinate on the graph represents voltage amplitude and the abscissa represents time. The impact peaks 75 in the signal are separated by a time period T representing the period of rotation of the inner race 2 of the bearing of FIG. 1 which has the defect 3 on it. The pointer 26 on the meter relay is set for a predetermined value of input applied thereto. For example, such value may correspond to a ratio of peak to root mean square amplitude value represented by the level 76 of the graph of FIG. 3. Accordingly, any peak exceeding this level would actuate the meter relay 23 which in turn would actuate the alarm 24 which then provides a visual or aural indication of the fact that the level has been exceeded. In the absence of any defect in the bearing being monitored no regularly occurring peak signals would appear, although occasionally transient peaks from external sources would appear while such peaks are detected by the peak detector 18, they are rejected by the long time constant circuit 22 and consequently do not actuate the meter relay 23. The time constant of the time constant network may be, for example, 100 times the period of rotation of the bearing element under consideration. In the operation of the system, should the level of the signal from the accelerometer change for various reasons, the ratio obtained from the divider would not change as both the root mean square value and the peak amplitude would change at the same time. Accordingly, the apparatus may be set to provide an alarm when peak to a mean value of the signal exceeds a predetermined value and such setting would not have to be changed when the apparatus is used with different bearings.

The apparatus of FIG. 2 may also be utilized for the detection of defects in gear assemblies as well as in bearing assemblies. FIG. 4 shows a gear transmission 80 including a plurality of gears 81, 82 and 83 which are mounted on respective shafts 84, 85 and 86 and supported in bearings (not shown) in the housing of the transmission. The gear 81 meshes with the gear 82, which in turn meshes with gear 83. Power may be applied to the shaft 84 and taken from shaft 86. Gear 84 has the largest number of teeth and gear 83 has the smallest number of teeth. The tooth 87 of gear 82 has a surface defect 88, for example, it is scored, and provides an uneven meshing surface with the teeth of gear 84. Rotation of the gear 84 at constant speed produces a series of impacts equally spaced in time. Gear assemblies generate considerable noise and defects may occur in gear elements other than the one being specifically monitored, consequently a complex series of peaks may be produced. If the gear assembly involves a few elements, a sensor may be placed close to the gear element being monitored and the signal therefrom processed directly by the apparatus of FIG. 2 as shown for processing bearing signals. However, in gear transmissions involving a large number of gears the vibrations from the transmission sensed by a sensor need to be further processed or the signal enhanced to obtain the signal which is representative or characteristic of the vibration produced by the particular gear element being monitored. The manner in which such characteristic vibration signal is obtained is also shown in FIG. 4.

The apparatus of FIG. 4 also includes a preamplifier 91 which amplifies the signal from the accelerometer, a bandpass filter 92 which eliminates extraneous background vibrations or noise signals, an amplifier 93 for the filtered signal, an optional rectifier 94 and a summation analyzer 95 to which the rectified signal is applied. The rectification of the amplified signal serves to avoid signal cancellation in summation analyzers which otherwise might happen if consecutive signal elements to be summed are not exactly identically positioned in time. Rectification is not always needed for further analysis. The apparatus further includes a tachometer 96 mechanically coupled to the drive shaft 84, a frequency converter and summation analyzer synchronizer 97. Synchronizer 97 converts the signal from the tachometer to a trigger signal having the same periodicity as the periodicity of the gear 82 being monitored. The trigger signal is applied to the summation analyzer 95 to synchronize the operation thereof.

The summation analyzer 95 is an apparatus such as Signal Analyzer type 5480B made by Hewlett Packard Co. of Santa Clara, California, which sums a plurality of signal sampling cycles, each cycle including a plurality of samples, and which provides an averaged output of one cycle of the summed sampling cycles. The summation analyzer is provided with an input terminal to which the signal to be analyzed is applied and a synchronizing terminal to which a synchronizing or trigger pulses from synchronizer 97 are applied to initiate the sampling cycles. Once initiated the summation analyzer takes a predetermined number of samples in sequence and stores the signal level of each sample in its memory. When it is again triggered by a subsequent trigger pulse, the sampling cycle is repeated and each sample of the cycle is added to a respective sample of the preceding cycle or cycles. After a predetermined number of cycles have been executed and averaged, the summation analyzer is automatically operated in the display or readout mode in which the averaged sum of the cycles of signal samples are supplied to the output terminal of the apparatus for display or further signal processing, as desired. The number of signal samples taken per cycle can be set as desired and the duration of the cycle of samples may also be set as desired to match the cyclical phenomena under study.

The output from the summation analyzer 95 is applied to the input of a.g.c. amplifier 71 of FIG. 2 in place of the signal from the filter 17. The signal from the output of a.g.c. amplifier 17 is processed in the same way as for the detection of bearing defects by the peak detector 18, the RMS detector 20, the divider 21, the long time constant circuit 22, the meter relay 23, and alarm 24 to provide an indication of a gear defect.

FIG. 5 shows graph 98 of vibrations with peaks 99 obtained from the summation analyzer 95 and produced by defect 88 in the gear 82. The ordinate on the graph represents voltage amplitude and the abscissa represents time. A predetermined level 100 of the peak 99 in relation to the root mean square value of the total signal 98 is automatically indicated by means of the apparatus shown in FIG. 2 by appropriate setting of the meter relay pointer 26 on its scale to correspond to the peak level 100. A particular advantage of the apparatus embodying the invention is that it does not depend on absolute levels of the signal, but only on relative measurements. Thus, the apparatus is not sensitive to changes in sensor or amplifier sensitivity, nor to the exact location of the sensor as long as the sensor is close to the housing of the bearing or gear.

While the invention has been described in specific embodiments it will be appreciated that modifications may be made by those skilled in the art and we intend by the appended claims to cover all such modifications as fall within the true spirit and scope of the invention.

What we claim as new and desire to secure by Letters Patent of the United States is:

1. A system for detecting damage to a rolling element in a pair of engaging rolling elements, said damage producing a component of vibration having a periodicity corresponding to the periodicity of rotation of said rolling element and having a peak above the level of other vibrations of said rolling elements,
   a vibration sensor coupled to said rolling element for sensing the vibrations thereof and converting said vibrations into a first electrical signal,
   means for deriving a second signal from said first signal corresponding to the peak value of said first electrical signal,
   means for deriving a third signal from said first signal corresponding to a mean value of the amplitude of said electrical signal,
   means for deriving a signal corresponding to the ratio of the amplitudes of said second signal and said third signal, and
   indicator means responsive to a predetermined level of said third signal corresponding to said peak of said component of vibration, whereby said damage is detected.

2. The combination of claim 1 in which signal enhancement means are provided to enhance the amplitude of the component of vibration in relation to the amplitude of the other vibrations.

3. The combination of claim 1 in which said rolling element is a rolling element of a bearing.

4. The combination of claim 1 in which said pair of rolling elements are gears in which the teeth of one of said gears engage the teeth of the other of said gears.

5. The combination of claim 1 in which said means for deriving a third signal derives a mean value signal corresponding to the average value of the rectification of said first electrical signal.

6. The combination of claim 1 in which said means for deriving a third signal derives a mean value signal corresponding to the root mean square value of said first electrical signal.

7. The combination of claim 1 in which a network is interfaced in the signal path from said means deriving said third signal to said indicator means, the time constant of said network being large in relation to the period of rotation of said rolling element.

* * * * *